United States Patent
Oniwa et al.

(10) Patent No.: US 8,573,352 B2
(45) Date of Patent: Nov. 5, 2013

(54) ELECTRIC POWER STEERING APPARATUS

(75) Inventors: Yoshihiro Oniwa, Utsunomiya (JP); Yasuo Shimizu, Shimotsuke (JP); Atsuhiko Yoneda, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 7 days.

(21) Appl. No.: 13/451,264

(22) Filed: Apr. 19, 2012

(65) Prior Publication Data
US 2012/0273293 A1   Nov. 1, 2012

(30) Foreign Application Priority Data
Apr. 26, 2011   (JP) ................. 2011-097766

(51) Int. Cl.
   *B62D 6/10*   (2006.01)
(52) U.S. Cl.
   USPC ......................................... 180/446
(58) Field of Classification Search
   None
   See application file for complete search history.

(56) References Cited

U.S. PATENT DOCUMENTS

| | | | | |
|---|---|---|---|---|
| 5,659,473 A | * | 8/1997 | Noro et al. | 701/42 |
| 6,883,637 B2 | * | 4/2005 | Nishizaki et al. | 180/446 |
| 8,050,825 B2 | * | 11/2011 | Ikeda et al. | 701/42 |
| 2003/0146041 A1 | * | 8/2003 | Kanda | 180/446 |
| 2007/0137924 A1 | * | 6/2007 | Kawada | 180/446 |

FOREIGN PATENT DOCUMENTS

| | | |
|---|---|---|
| DE | 696 13 743 T2 | 4/2002 |
| EP | 0 737 611 81 | 7/2001 |
| JP | 2004-098754 A | 4/2004 |

* cited by examiner

*Primary Examiner* — Tony Winner
(74) *Attorney, Agent, or Firm* — Arent Fox LLP

(57) ABSTRACT

As a quotient, which is produced when the value of an assistive current for causing an electric motor to generate an assistive torque is divided by the value of a steering torque detected by a steering torque sensor, becomes greater, a greater phase-lag compensation (smaller phase-lead compensation) is performed on the steering torque detected by the steering torque sensor. Within a region in which the steering sensation is reduced, a greater phase-lead compensation is performed.

2 Claims, 4 Drawing Sheets

ELECTRIC POWER STEERING APPARATUS

CROSS-REFERENCE TO RELATED APPLICATION

This application is based upon and claims the benefit of priority from Japanese Patent Application No. 2011-097766 filed on Apr. 26, 2011, of which the contents are incorporated herein by reference.

BACKGROUND OF THE INVENTION

1. Field of the Invention

The present invention relates to an electric power steering apparatus for transmitting power from an electric motor, which serves as an assistive steering force (steering assisting force), to a vehicle steering system, in order to reduce the burden on the driver of a vehicle to operate a steering member such as a steering wheel when the driver turns the steering member to steer the vehicle.

2. Description of the Related Art

Recent years have seen widespread use of electric power steering apparatus, which detect a steering torque generated by the steering wheel of a vehicle with a steering torque sensor, and energize an electric motor to generate an assistive steering force depending on the detected steering torque, in order to allow the driver of the vehicle to turn the vehicle by applying a light steering force to the steering wheel.

Such electric power steering apparatus perform phase compensation on the steering torque that is detected by the steering torque sensor for achieving control stability.

Japanese Laid-Open Patent Publication No. 2004-098754 (hereinafter referred to as "JP2004-098754A") discloses an electric power steering apparatus, which reduces the gain of a phase compensation and simultaneously performs a greater phase-lag compensation, i.e., a smaller phase-lead compensation, as the steering torque detected by a steering torque sensor becomes greater, and which reduces the gain and performs a greater phase-lag compensation, i.e., a smaller phase-lead compensation, as the vehicle speed becomes lower.

SUMMARY OF THE INVENTION

However, the electric power steering apparatus disclosed in JP2004-098754A is disadvantageous in that, since the gain is lower, and the phase-lag compensation is greater as the vehicle speed becomes lower, the driver feels a delay in application of the assistive steering force, thus resulting in a reduction in the steering sensation felt by the driver at lower vehicle speeds.

It is an object of the present invention to provide an electric power steering apparatus for a vehicle, which achieves control stability irrespective of the speed of the vehicle, and which does not cause a reduction in the steering sensation felt by the driver of the vehicle.

Another object of the present invention is to provide an electric power steering apparatus, which is capable of performing an appropriate phase compensation depending on an individual vehicle that incorporates the electric power steering apparatus therein.

According to the present invention, there is provided an electric power steering apparatus for controlling an electric motor depending on a steering torque applied to a steering member, and for transmitting drive power generated by the electric motor to a steering mechanism to assist in operating the steering member, comprising a steering torque sensor for detecting a steering torque, a phase compensator for performing phase compensation on a torque signal output from the steering torque sensor, and an assistive current determiner for determining an assistive current that flows to the electric motor based on the torque signal, which has been phase-compensated by the phase compensator, wherein the phase compensator performs a greater phase-lag compensation on the torque signal output from the steering torque sensor as the assistive current becomes greater.

According to the present invention, as the assistive current for enabling the electric motor to generate an assistive torque becomes greater, a greater phase-lag compensation (smaller phase-lead compensation) is performed on the torque signal that is output from the steering torque sensor. Therefore, within a region in which the assistive current is greater, a smaller phase-lead compensation is performed for achieving control stability. Further, within a region in which the assistive current is smaller, resulting in a possible reduction in steering sensation, a greater phase-lead compensation is performed in order to achieve a satisfactory steering sensation. Accordingly, the steering sensation is not decreased at low vehicle speeds, and the steering wheel can be operated favorably irrespective of vehicle speed. As a result, an appropriate phase compensation depending on individual vehicles can be performed.

According to the present invention, there also is provided an electric power steering apparatus for controlling an electric motor depending on a steering torque applied to a steering member, and for transmitting drive power generated by the electric motor to a steering mechanism in order to assist in operating the steering member, comprising a steering torque sensor for detecting a steering torque, a phase compensator for performing phase compensation on a torque signal output from the steering torque sensor, an assistive current determiner for determining an assistive current that flows to the electric motor based on the torque signal, which has been phase-compensated by the phase compensator, and a quotient calculator for calculating a quotient by dividing a value of the assistive current by a value of the steering torque, wherein the phase compensator performs a greater phase-lag compensation on the torque signal that is output from the steering torque sensor as the quotient calculated by the quotient calculator becomes greater.

According to the present invention, a greater phase-lag compensation (smaller phase-lead compensation) is performed on the torque signal that is output from the steering torque sensor as the quotient (assistive current/steering torque), which is produced when the value of the assistive current for enabling the electric motor to generate an assistive torque is divided by the value of the steering torque detected by the steering torque sensor, becomes greater. Consequently, within a region in which the quotient (assistive current/steering torque) is greater, a smaller phase-lead compensation is performed for achieving control stability. Further, within a region in which the quotient (assistive current/steering torque) is smaller, resulting in reduced steering sensation, a greater phase-lag compensation is performed in order to achieve a favorable steering sensation. Accordingly, the steering sensation is not decreased at low vehicle speeds. As a result, a favorable steering sensation can be achieved irrespective of vehicle speed, and as a result, an appropriate phase compensation depending on individual vehicles can be performed.

If a vehicle incorporates an electric power steering apparatus therein, which performs an inertia compensation for smoothly starting to assist in operating the steering member when the steering member begins to turn, and in addition to a vehicle speed control for reducing the assistive torque as the vehicle speed becomes higher, a damper correction is performed for allowing the steering member to converge satisfactorily when the steering member is returned upon being released by the driver of the vehicle, then a phase compensation can be performed in view of the vehicle speed control, inertia compensation, and damper correction.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Electric power steering apparatus according to preferred embodiments of the present invention will be described below with reference to the drawings.

Figure 1:
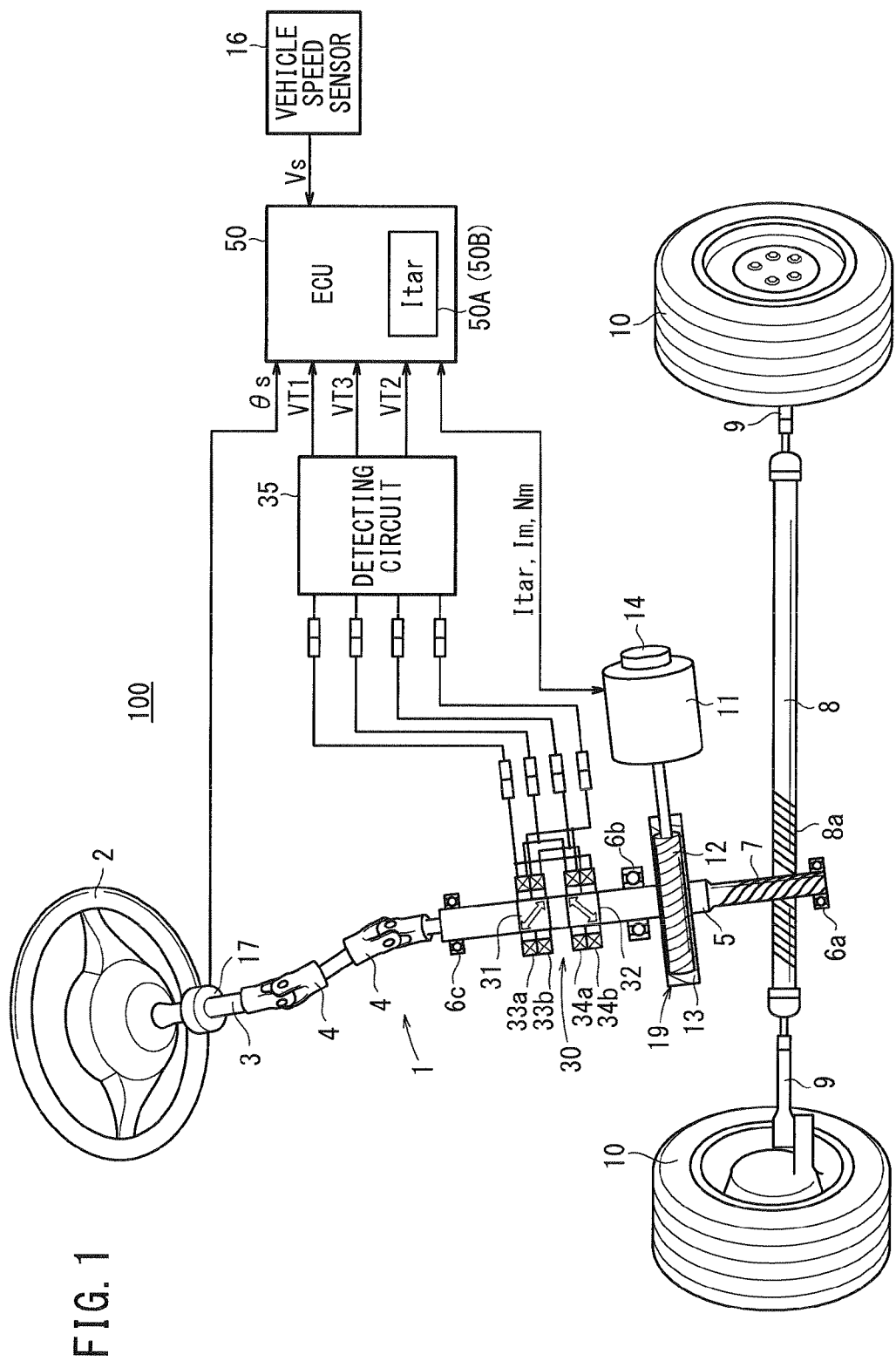
FIG. 1 is a schematic view, partially in block form, of an electric power steering apparatus according to an embodiment of the present invention.

FIG. 1 schematically shows, partially in block form, an electric power steering apparatus 100 according to an embodiment of the present invention.

As shown in FIG. 1, the electric power steering apparatus 100, which is incorporated in a vehicle, includes a steering shaft assembly 1 coupled to a steering wheel 2, which serves as a steering member. The steering shaft assembly 1 includes a main steering shaft 3 integrally connected to the steering wheel 2, and a pinion shaft 5 having a pinion gear 7 of a rack and pinion mechanism. The main steering shaft 3 and the pinion shaft 5 are coupled to each other by a pair of universal joints 4.

The pinion shaft 5 has an upper portion, an intermediate portion, and a lower portion, which are supported respectively by bearings 6a, 6b, and 6c. The pinion gear 7 is disposed on a lower end portion of the pinion shaft 5. The pinion gear 7 is held in mesh with rack teeth 8a of a rack bar 8, which is movable axially back and forth in transverse directions of the vehicle. Opposite ends of the rack bar 8 are coupled to left and right front wheels 10, which function as steerable wheels of the vehicle, by respective tie rods 9.

When the driver of the vehicle turns the steering wheel 2, the steering shaft assembly 1 turns the front wheels 10 through the rack and pinion mechanism, thereby steering the vehicle. The rack bar 8, the rack teeth 8a, and the tie rods 9 jointly make up a steering mechanism.

The electric power steering apparatus 100 also includes an electric motor 11 for supplying an assistive steering force to the pinion shaft 5, so as to reduce the manual steering force that the driver must apply to the steering wheel 2. The electric motor 11 has an output shaft supporting a worm gear 12 thereon that is held in driving mesh with a worm wheel 13, which is mounted on the pinion shaft 5 beneath the intermediate bearing 6b. The worm gear 12 and the worm wheel 13 jointly make up a speed reducing mechanism 19, which functions to smoothly convert the rotational drive power of the electric motor 11 into a boosted rotational drive power of the pinion shaft 5.

A magnetostrictive steering torque sensor 30 of a known nature, which detects a torque applied to the pinion shaft 5, i.e., the steering shaft assembly 1, based on changes in magnetic properties thereof due to magnetostriction, is mounted on the pinion shaft 5 between the intermediate bearing 6b and the upper bearing 6c.

The magnetostrictive steering torque sensor 30 comprises first and second magnetostrictive films 31, 32, which are mounted annularly on the outer circumferential surface of the pinion shaft 5 extending fully circumferentially around the pinion shaft 5, first and second detecting coils 33a, 33b disposed around the first magnetostrictive film 31 in radially facing relation thereto, third and fourth detecting coils 34a, 34b disposed around the second magnetostrictive film 32 in radially facing relation thereto, and a detecting circuit 35 electrically connected respectively to the first, second, third, and fourth detecting coils 33a, 33b, 34a, and 34b.

Each of the first and second magnetostrictive films 31, 32 comprises a metal film made of a metal material the magnetic permeability of which changes greatly when strained. For example, each of the first and second magnetostrictive films 31, 32 is in the form of an alloy film of Ni and Fe, which is plated on the outer circumferential surface of the pinion shaft 5.

The first magnetostrictive film 31 exhibits a magnetic anisotropy along a direction inclined by about 45° to the axis of the pinion shaft 5. The second magnetostrictive film 32 exhibits a magnetic anisotropy along a direction inclined by about 90° to the direction of the magnetic anisotropy of the first magnetostrictive film 31. Therefore, the magnetic anisotropies of the respective first and second magnetostrictive films 31, 32 are substantially 90° out of phase with each other.

The first and second detecting coils 33a, 33b are disposed coaxially with respect to the first magnetostrictive film 31, and are disposed around the first magnetostrictive film 31 with a gap defined therebetween. The third and fourth detecting coils 34a, 34b are disposed coaxially with respect to the second magnetostrictive film 32, and are disposed around the second magnetostrictive film 32 with a gap defined therebetween.

Since, as described above, the magnetic anisotropies of the respective first and second magnetostrictive films 31, 32 are substantially 90° out of phase with each other, when a steering torque is applied to the pinion shaft 5, a compressive force is applied to one of the first and second magnetostrictive films 31, 32, whereas a tensile force is applied to the other of the first and second magnetostrictive films 31, 32. As a result, the magnetic permeability of one of the first and second magnetostrictive films 31, 32 increases, whereas the magnetic permeability of the other of the first and second magnetostrictive films 31, 32 decreases. Consequently, the inductance of the detecting coils 33a, 33b or 34a, 34b, which are disposed around one of the first and second magnetostrictive films 31, 32 increases, whereas the inductance of the detecting coils 34a, 34b or 33a, 33b, which are disposed around the other of the first and second magnetostrictive films 31, 32 decreases.

The detecting circuit 35 converts changes in the respective inductances of the detecting coils 33a, 33b, 34a, 34b into failure detection signals VT1, VT2, and a steering torque signal (hereinafter referred to as a "steering torque") VT3.

The detecting circuit 35 outputs the failure detection signals VT1, VT2 and the steering torque VT3 to an ECU (electronic control unit) 50.

The ECU 50 includes a microcomputer having a CPU, a ROM, a RAM, input and output interfaces such as an A/D converter and a D/A converter, and a timer, etc. When the CPU of the microcomputer executes programs stored in the ROM based on various input signals applied to the CPU, the ECU 50 performs various functions (acting as various functional means) to control the electric motor 11.

As described above, the detecting circuit 35 (steering torque sensor 30) detects the steering torque VT3 that is applied to the pinion shaft 5 of the steering shaft assembly 1. A rotational speed sensor (rotational speed detector) 14 detects a rotational speed Nm of the electric motor 11. A vehicle speed sensor 16 detects a vehicle speed Vs at which the vehicle travels. A steering angle sensor 17 detects a steering angle θs of the steering wheel 2. One of the operations performed by the ECU 50 is to function as a target current calculator 50A. The target current calculator 50A calculates a target current Itar based on output signals (i.e., the steering torque VT3, the rotational speed Nm, the vehicle speed Vs, and the steering angle θs) from the detecting circuit 35, the rotational speed sensor 14, the vehicle speed sensor 16, and the steering angle sensor 17. The target current calculator 50A controls the electric motor 11 to bring the calculated target current Itar into conformity with the current Im flowing to the electric motor 11, thereby generating a steering assisting force in order to reduce the manual steering force that the driver applies to the steering wheel 2.

Figure 2:
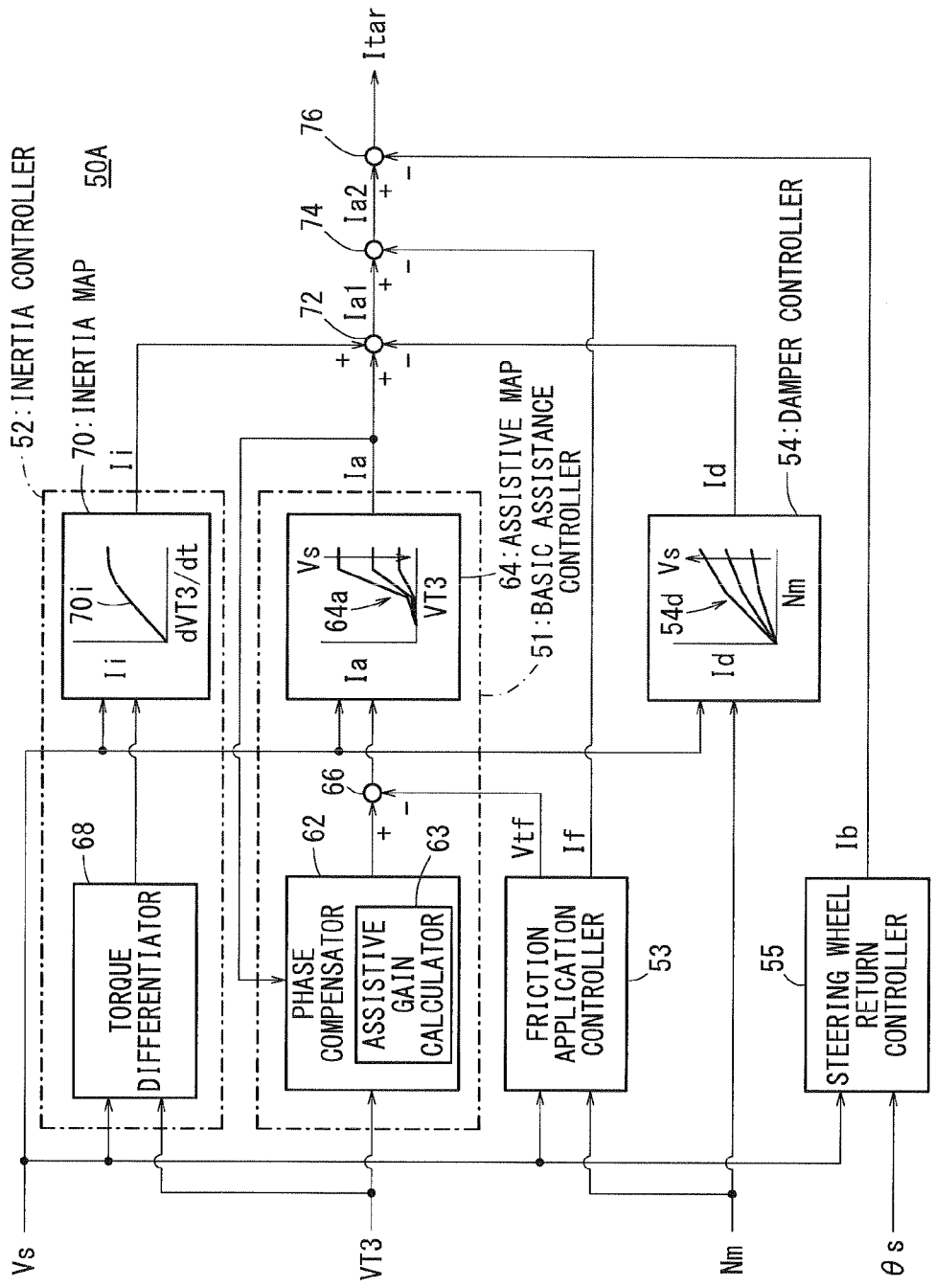
FIG. 2 is a functional block diagram of a target current calculator, which includes a phase compensator, of the electric power steering apparatus shown in FIG. 1.

FIG. 2 shows detailed functions of the target current calculator 50A of the ECU 50 for calculating an assistive current Ia and a target current Itar to be supplied to the electric motor 11 for generating a steering assisting force.

A process of calculating the assistive current Ia and the target current Itar, which is carried out by the target current calculator 50A for controlling the electric motor 11, will be described in detail below, particularly in relation to a processing sequence of a phase compensator 62.

As shown in FIG. 2, for reducing a manual steering force that the driver applies to the steering wheel 2, the target current calculator 50A includes a basic assistance controller 51, an inertia controller 52, a friction application controller 53, a damper controller 54, and a steering wheel return controller 55.

The basic assistance controller 51 includes a phase compensator 62, an assistive map (assistance characteristic section) 64, and a torque value subtractor 66.

The phase compensator 62 operates to compensate for a delay in system response, between the time that the steering torque sensor 30 detects the steering torque VT3, and the time that the speed reducing mechanism 19 applies a steering assisting force (boosted force) to the pinion shaft 5. In order to compensate for such a delay, the phase compensator 62 refers to the assistive current Ia, and generates a gain (amplitude) G [dB] of the steering torque (steering torque signal) VT3 detected by the detecting circuit 35, and a compensated steering torque (also indicated as VT3) the phase θ [deg] of which has been compensated.

The assistive map 64 calculates an assistive current Ia (basic assistive current) based on the phase-compensated steering torque VT3 and the vehicle speed Vs.

The assistive map 64 represents an assistive characteristic curve 64a, as illustrated in the block shown in FIG. 2. The assistive characteristic curve 64a exhibits a gain (assistive current Ia), which is lower as the vehicle speed Vs becomes higher, and is higher as the steering torque VT3 becomes greater.

Since the assistive current Ia generally increases as the steering torque VT3 increases, and decreases as the vehicle speed Vs increases, the electric motor 11 can generate a basic steering assisting force that matches the sensation felt by the driver.

The inertia controller 52 includes a torque differentiator 68 and an inertia map (inertia characteristic section) 70. The torque differentiator 68 differentiates the steering torque VT3, and extracts a transient response of a positive-going edge (negative-going edge) of the differential, as a differential value dVT3/dt (where d represents a differential operator), in order to compensate for a reduction in response due to the inertia (inertial moment) of the rotor of the electric motor 11, when the steering wheel 2 starts to turn or is returned to an initial position.

The torque differentiator 68 also multiplies the extracted differential value dVT3/dt by a coefficient that depends on a change caused in vehicle response by the vehicle speed Vs, and supplies the product to the inertia map 70.

The inertia map 70, which has an inertia characteristic curve 70i as illustrated in the block shown in FIG. 2, calculates an inertia current Ii, which is generally proportional to the differential value dVT3/dt supplied from the torque differentiator 68. A current computing unit (current adder/subtractor) 72 adds the calculated inertia current Ii to the assistive current Ia from the assistive map 64.

The damper controller 54 refers to a damper characteristic curve (damper map) 54d, as illustrated in the block shown in FIG. 2, based on the rotational speed Nm of the electric motor 11 and the vehicle speed Vs. The damper controller 54 calculates a damper current Id, which becomes greater as the rotational speed Nm and the vehicle speed Vs are higher, in order to increase the convergence of the steering wheel 2. The current computing unit 72 subtracts the damper current Id from the sum of the assistive current Ia and the inertia current Ii, so as to produce an assistive current Ia1 for reducing the rotational torque of the electric motor 11. The reduced rotational torque of the electric motor 11 provides a steering damper effect in order to increase the convergence of the steering wheel 2.

The steering wheel return controller 55 calculates a steering wheel return current Ib based on the steering angle θs and the vehicle speed Vs, in order to increase the return action of the steering wheel 2. More specifically, the steering wheel return controller 55 calculates the steering wheel return current Ib according to characteristics so as to cause the steering wheel 2 to return naturally under a self-aligning torque when the steering wheel 2 is returned to its initial position. A current subtractor 76 subtracts the steering wheel return current Ib from an assistive current Ia2. By subtracting the steering wheel return current Ib in this manner, the rotational torque of the electric motor 11 can be reduced smoothly depending on a reduction in the steering angle θs.

The friction application controller 53 calculates an applied frictional torque Vtf based on the rotational speed Nm and the vehicle speed Vs, and converts the calculated applied frictional torque Vtf into an applied frictional current If. The torque value subtractor 66 subtracts the applied frictional torque Vtf from the phase-compensated steering torque VT3. A current subtractor 74 subtracts the applied frictional current If from the assistive current Ia1 by, thereby producing the assistive current Ia2. By subtracting the applied frictional current If in this manner, an amount of mechanical friction can be applied electrically to the electric power steering apparatus 100.

As shown in FIG. 2, the target current Itar, which is supplied to the electric motor 11, is calculated according to the following equation (1):

$$\begin{aligned} Itar &= Ia + Ii - Id - If - Ib \\ &= Ia1 - If - Ib \\ &= Ia2 - Ib \end{aligned} \quad (1)$$

Phase compensation in the electric power steering apparatus 100 is performed in order to maintain control over stability of the vehicle steering system. If the gain G is 0 [dB] (=1) or lower in order to delay the phase θ for achieving higher stability when the frequency of the signal that represents the steering torque VT3 is within a range from about $10^0$=1 [Hz] to $10^2$=100 [Hz], then the steering sensation felt by the driver is decreased. If the gain is reduced as the vehicle speed becomes lower for providing a greater phase-lag compensation (smaller phase-lead compensation), as disclosed in JP2004-098754A, then the steering sensation is decreased at lower vehicle speeds.

Figure 3:
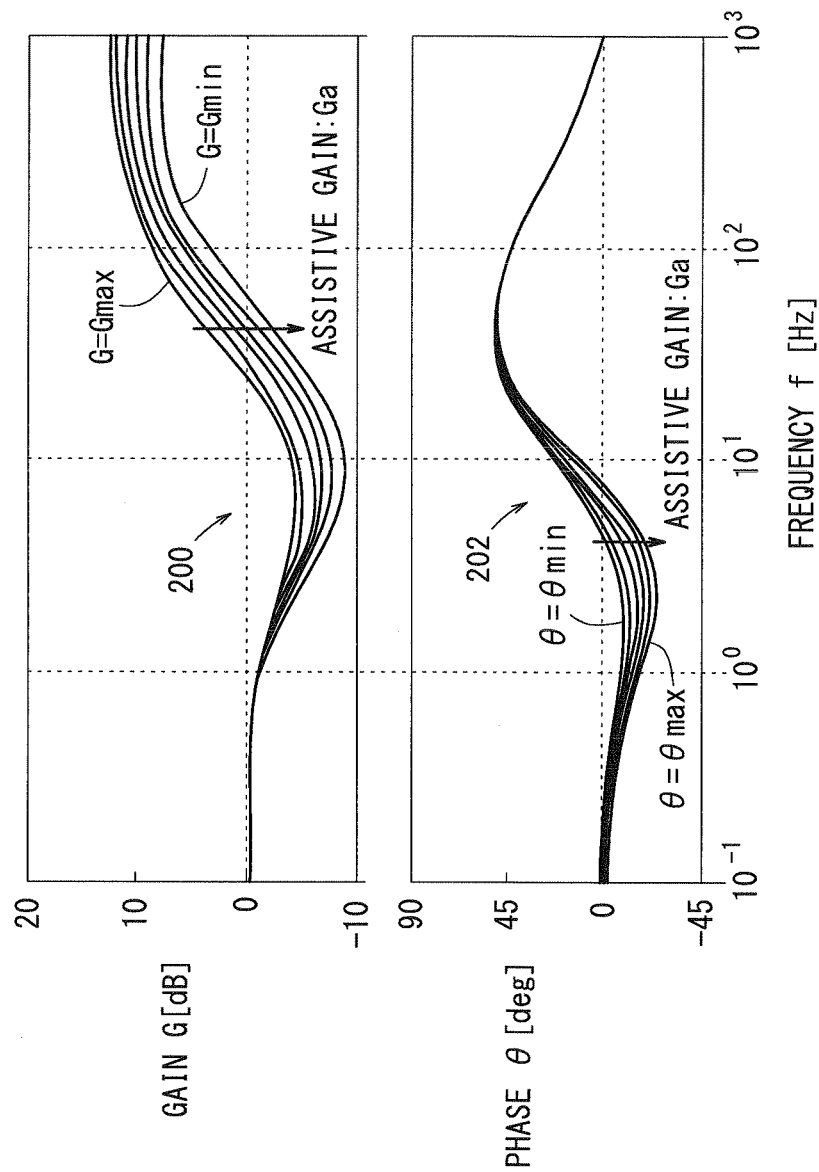
FIG. 3 is a Bode diagram illustrative of operations of the phase compensator of the target current calculator.

According to the present embodiment, the phase compensator 62 sets the gain G [dB] based on the gain characteristic curve 200 shown in the upper portion of FIG. 3, and sets the phase θ [deg] based on the phase characteristic curve 202 shown in the lower portion of FIG. 3.

More specifically, when the phase compensator 62 is supplied with the steering torque VT3, the phase compensator 62 outputs a compensated steering torque VT3, which is phase-compensated (default-compensated) using the settings (default settings) of the gain G=Gmin and the phase θ=θmin based on the frequency of the signal that represents the steering torque VT3. The default settings may be represented by the gain G, as a central value between Gmin and Gmax, and the phase θ, as a central value between θmin and θmax.

The torque value subtractor 66 subtracts the frictional torque Vtf from the default-compensated steering torque value VT3 in order to produce a corrected steering torque value VT3, and the torque value subtractor 66 inputs the corrected steering torque value VT3 to the assistive map 64. The assistive map 64 refers to the assistive characteristic curve 64a in order to calculate an assistive current Ia, which depends on the vehicle speed Vs and the steering torque VT3, and the assistive map 64 supplies the calculated assistive current Ia to the phase compensator 62 through a feedback loop.

The phase compensator 62 includes an assistive gain calculator 63, which calculates an assistive gain G according to the following equation (2):

$$Ga = Ia \div VT3 \quad (2)$$

In other words, the assistive gain Ga is a quotient, which is calculated when the assistive current Ia from the assistive map 64 is divided by the steering torque VT3 produced by the detecting circuit 35.

As can be seen from the gain characteristic curve 200 in FIG. 3, the phase compensator 62 sets the gain G along a minimum gain characteristic curve Gmin, for thereby reducing the gain G as the assistive gain Ga (=Ia/VT3) becomes greater. The phase compensator 62 also sets the gain G along a maximum gain characteristic curve Gmax, for thereby increasing the gain G as the assistive gain Ga becomes smaller.

As can be seen from the phase characteristic curve 202 shown in FIG. 3, the phase compensator 62 sets the phase θ along a maximum phase-lag characteristic curve θmax as the assistive gain Ga (=Ia/VT3) becomes greater, and also sets the phase θ along a minimum phase-lag characteristic curve θmin as the assistive gain Ga becomes smaller.

Briefly stated, the phase compensator 62 sets a gain G, which is lower, and a lagging phase θ, which is greater (or a leading phase θ, which is smaller), as the assistive gain Ga (=Ia/VT3) becomes greater.

The phase compensator 62 calculates a compensated steering torque VT3 by compensating the signal from the detecting circuit 35, which is representative of the steering torque VT3, using the gain G and the phase θ, which have been set as described above. The torque value subtractor 66 inputs the phase-compensated steering torque VT3, which is produced by subtracting the frictional torque Vtf from the compensated steering torque VT3, to the assistive map 64. Depending on the phase-compensated steering torque VT3, the assistive map 64 refers to the assistive characteristic curve 64a in order to calculate an assistive current Ia in view of the assistive gain Ga (=Ia/VT3).

Then, according to the above equation (1), a target current Itar is calculated from the assistive current Ia in view of the assistive gain Ga (=Ia/VT3), and the calculated target current Itar is supplied to the electric motor 11. Since the target current Itar is calculated in periodic cycles, each of which is on the order of milliseconds, the feedback-based calculation is completed in a very short period of time within the target current calculator 50A including the phase compensator 62.

The ECU 50 performs a feedback control process for equalizing the motor current Im, which flows to the electric motor 11, to the target current Itar.

As described above, the phase compensator 62 sets a gain G, which is lower, and a lagging phase θ, which is greater, as the assistive gain Ga (=Ia/VT3) becomes greater. Therefore, control stability is maintained within a region in which the assistive gain Ga (=Ia/VT3) is large.

Within a region in which the assistive gain Ga (=Ia/VT3) is small, e.g., when the steering wheel 2 is near a central position thereof in a high-speed or low-speed range, in which the assistive current Ia is small although the steering torque VT3 is large, the driver tends to experience a delayed steering sensation. According to the present embodiment, within such a region, the gain G is increased and the lagging phase θ is reduced, thereby allowing the driver to experience a favorable steering sensation.

According to the present embodiment, the phase compensator 62 of the target current calculator 50A performs a greater phase-lag compensation on the steering torque VT3 from the detecting circuit 35 as the assistive gain (quotient) Ga (=Ia/VT3), which is calculated by the assistive gain calculator (quotient calculator) 63, becomes greater. However, as shown in FIG. 4, a target current calculator 50B may supply a target current Itar to the phase compensator 62 through a feedback loop, whereby the assistive gain calculator 63 of the phase compensator 62 calculates the assistive gain Ga according to the following equation (3):

$$Ga = Itar \div VT3 \quad (3)$$

Figure 4:
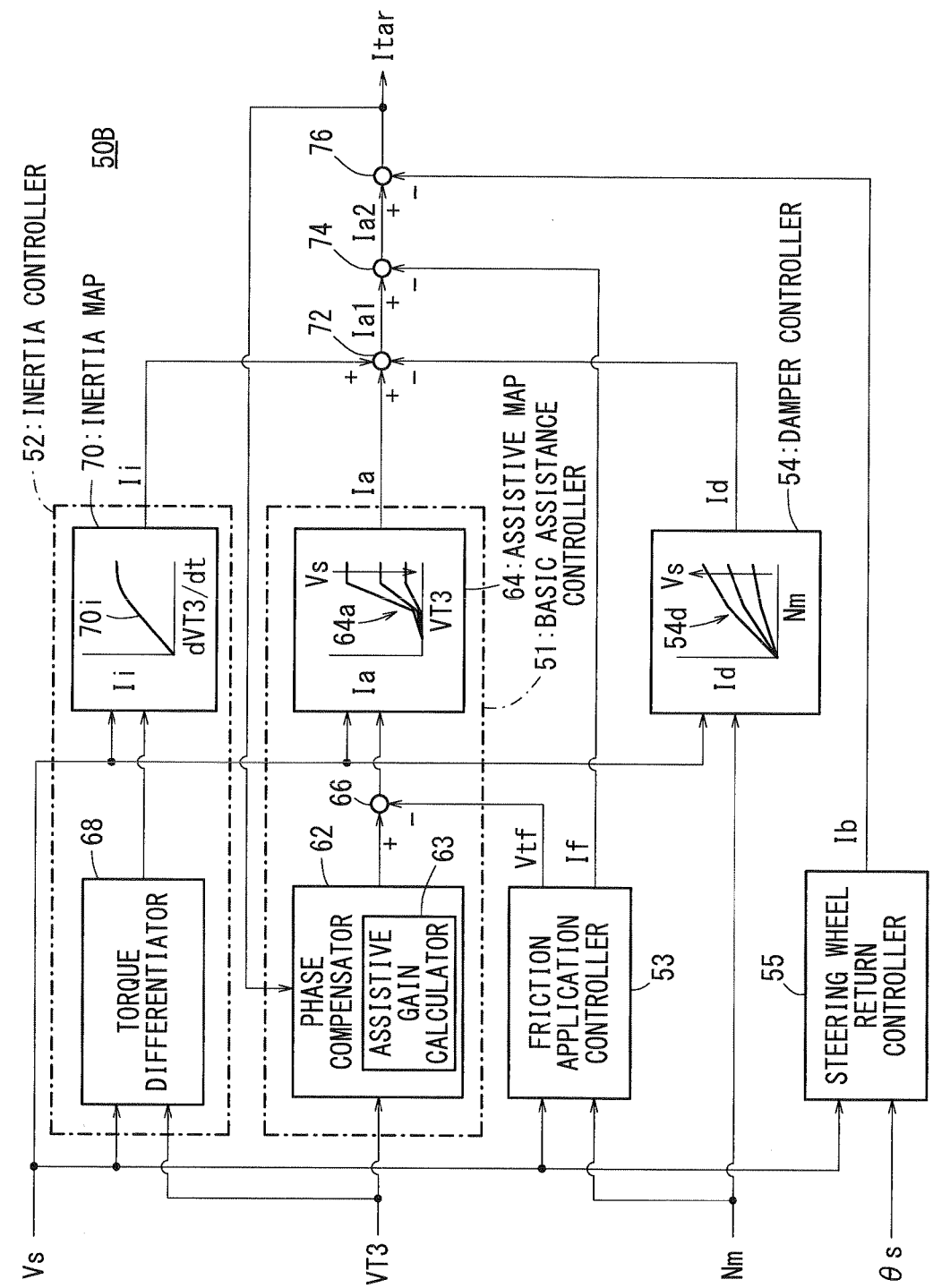
FIG. 4 is a functional block diagram of a target current calculator, which includes a phase compensator, according to another embodiment of the present invention.

In FIG. 4, the assistive gain Ga is calculated as a quotient when the target current Itar is divided by the steering torque VT3. More specifically, the assistive gain Ga is calculated in the following manner. The torque value subtractor 66 subtracts the frictional torque Vtf from the steering torque VT3, which is output from the detecting circuit 35. Then, the assistive map 64 calculates an assistive current Ia. The current computing unit 72 adds the inertia current Ii to the assistive current Ia, and subtracts the damper current Id from the assistive current Ia, thereby producing an assistive current Ia1. The current subtractor 74 subtracts the frictional current If from the assistive current Ia1, thereby producing an assistive current Ia2. The current subtractor 76 then subtracts the steering wheel return current Ib from the assistive current Ia2, thereby producing a target current Itar. Thereafter, the phase compensator 62 divides the target current Itar by the steering torque VT3 from the detecting circuit 35, thereby setting an assistive gain Ga.

In the foregoing manner, in addition to the assistive current Ia, since the assistive gain Ga is set in view of the inertia current Ii, the frictional current If, the damper current Id, and the steering wheel return current Ib, the driver experiences an improved steering sensation.

According to a further modification, provided that the steering torque VT3 is constant, the assistive gain Ga is proportional to the assistive current Ia and the target current Itar, and as can be seen from equation (2), Ga=Ia÷VT3, and equation (3), Ga=Itar÷VT3. In other words, the assistive gain Ga can be converted respectively into the assistive current Ia and the target current Itar. Consequently, the gain characteristic curve 200 and the phase characteristic curve 202 shown in FIG. 3 may be generated using as parameters the assistive current Ia and the target current Itar. In other words, the phase compensator 62 may control the gain G and the phase θ based on the assistive current Ia and the target current Itar.

Therefore, the phase compensator 62 can perform phase compensation based on any one of the assistive current Ia, the target current Itar, the assistive gain Ga (=Ia/VT3), and the assistive gain Ga (Itar/VT3), which are supplied through a feedback loop.

If the phase compensator 62 performs phase compensation based on the assistive current Ia or the target current Itar supplied through a feedback loop, then the assistive gain calculator 63, which is shown as part of the phase compensator 62 in FIG. 3, is not required and may be dispensed with.

Advantages of the Present Embodiments

As described above, the electric power steering apparatus 100 controls the electric motor 11 depending on the steering torque VT3, which is applied to the steering member, i.e., the steering wheel 2, and transmits the drive power generated by the electric motor 11 to the steering mechanism in order to assist the driver in operating the steering wheel 2 to steer the vehicle.

The electric power steering apparatus 100 includes the steering torque sensor 30, which detects the steering torque VT3, the phase compensator 62, which performs phase compensation on the steering torque (torque signal) VT3 output from the steering torque sensor 30 (detecting circuit 35), and the target current calculator 50A, 50B including an assistive current determiner, which determines the assistive current Ia (target current Itar) that flows to the electric motor 11 based on the steering torque VT3, which has been phase-compensated by the phase compensator 62. The phase compensator 62 includes the assistive gain calculator 63, which serves as a quotient calculator, for calculating the assistive gain Ga (=Ia/VT3=assistive current/steering torque), which is a quotient produced when the value of the assistive current Ia is divided by the value of the steering torque VT3. As the assistive gain Ga (=Ia/VT3) calculated by the assistive gain calculator 63 becomes greater, the phase compensator 62 performs a greater phase-lag compensation (smaller phase-lead compensation) on the steering torque VT3, which is output from the steering torque sensor 30. Therefore, within the region in which the assistive gain Ga (=Ia/VT3) is greater, a greater phase-lag compensation (smaller phase-lead compensation) is performed, so as to achieve control stability. Within the region in which the assistive gain Ga (=Ia/VT3) is smaller, resulting in a possible reduction in the steering sensation, a smaller phase-lag compensation (greater phase-lead compensation) is performed for achieving a favorable steering sensation. Accordingly, the steering sensation felt by the driver is not decreased at low vehicle speeds. As a result, an appropriate phase compensation depending on the characteristics of individual vehicles can be performed.

For performing phase compensation, the phase compensator 62 may refer to the quotient (Itar/VT3) produced when the target current Itar is divided by the steering torque VT3, for thereby calculating the assistive gain.

Alternatively, the electric power steering apparatus 100 includes the steering torque sensor 30, which detects the steering torque VT3, and the phase compensator 62, which performs phase compensation on the steering torque (torque signal) VT3 output from the steering torque sensor 30 (detecting circuit 35), in which case, the assistive current Ia (target current Itar) that flows to the electric motor 11 is determined based on the steering torque VT3, which has been phase-compensated by the phase compensator 62. As the assistive current Ia becomes greater, the phase compensator 62 performs a greater phase-lag compensation (smaller phase-lead compensation) on the steering torque VT3, which is output from the steering torque sensor 30. Within the region in which the assistive current Ia is greater, a greater phase-lag compensation (smaller phase-lead compensation) is performed for achieving control stability. Within the region in which the assistive current Ia is smaller, resulting in a possible reduction in the steering sensation, a smaller phase-lag compensation (greater phase-lead compensation) is performed in order to achieve a favorable steering sensation. Accordingly, the steering sensation is not decreased at low vehicle speeds. As a result, an appropriate phase compensation depending on individual vehicle characteristics can be performed.

For performing phase compensation, rather than the assistive current Ia, the phase compensator 62 may refer to the target current Itar.

The target current calculators 50A, 50B shown in FIGS. 2 and 4, respectively, may be modified such that the target current calculators 50A, 50B are devoid of the friction application controller 53 and the steering wheel return controller 55.

Although certain preferred embodiments of the present invention have been shown and described in detail, it should be understood that various changes and modification may be made to the embodiments without departing from the scope of the invention as set forth in the appended claims.

What is claimed is:

1. An electric power steering apparatus for controlling an electric motor depending on a steering torque applied to a steering member, and for transmitting drive power generated by the electric motor to a steering mechanism in order to assist in operating the steering member, comprising:
   a steering torque sensor for detecting the steering torque;
   a phase compensator for performing phase compensation on a torque signal output from the steering torque sensor; and
   an assistive current determiner for determining an assistive current that flows to the electric motor based on the torque signal, which has been phase-compensated by the phase compensator, wherein the phase compensator performs a greater phase-lag compensation on the torque signal, which is output from the steering torque sensor, as the assistive current becomes greater.

2. An electric power steering apparatus for controlling an electric motor depending on a steering torque applied to a steering member, and for transmitting drive power generated by the electric motor to a steering mechanism in order to assist in operating the steering member, comprising:
- a steering torque sensor for detecting a steering torque;
- a phase compensator for performing phase compensation on a torque signal output from the steering torque sensor;
- an assistive current determiner for determining an assistive current that flows to the electric motor based on the torque signal, which has been phase-compensated by the phase compensator; and
- a quotient calculator for calculating a quotient by dividing a value of the assistive current by a value of the steering torque, wherein the phase compensator performs a greater phase-lag compensation on the torque signal, which is output from the steering torque sensor, as the quotient calculated by the quotient calculator becomes greater.

* * * * *